Sept. 4, 1956  P. B. WEISZ  2,761,975

METHOD AND APPARATUS FOR DETECTING HYDROCARBONS

Filed Dec. 12, 1951  2 Sheets-Sheet 1

INVENTOR.
PAUL B. WEISZ
BY
ATTORNEY

United States Patent Office

2,761,975
Patented Sept. 4, 1956

2,761,975

METHOD AND APPARATUS FOR DETECTING HYDROCARBONS

Paul B. Weisz, Pitman, N. J., assignor to Socony Mobil Oil Company, Inc., a corporation of New York Application December 12, 1951, Serial No. 261,349

3 Claims. (Cl. 250—43.5)

This invention has to do with the detection of small amounts of hydrocarbons in gas samples containing the same.

In exploration for oil, one method which has received attention is that of collecting soil-gas samples from a series of points distributed in a pattern across the area under examination, followed by analysis of these soil-gas samples for hydrocarbons in an attempt to determine whether or not the area examined has an underlying oil deposit. While many refinements of technique have been worked out in the collection of samples, and their proper correlation with the possible underground deposits, one point of trouble has been the analysis of the samples. Classical methods of analysis have been applied with difficulty. Most methods of suitable accuracy have been "bench" methods, adaptable for application only in a laboratory, usually at some distance from the point of sample collection. Relatively few methods have been developed showing any promise for use at or near the site of sample collection. The most desirable method is one which can be expressed in apparatus combining high portability and accuracy, together with ruggedness, in order that the soil-gas analysis could be conducted in the field, thus avoiding all of the inherent difficulties such as contamination, loss, and others arising from a method which requires taking of samples in the field, transportation to a laboratory, and probably intervening storage prior to analysis.

This invention is directed to a method for such analysis and to an apparatus for accomplishing such method.

This invention has for its object the provision of a method and apparatus capable of detecting hydrocarbons, particularly in soil gas samples, and capable of differentiating between methane and hydrocarbons of 2 carbon atoms and higher.

It is based upon the utilization of knowledge of the ionization potentials of hydrocarbon gases. An important feature is the capability of differentiating between methane and higher hydrocarbons, since methane may and does frequently arise from sources not associated with petroliferous deposits, whereas ethane and particularly higher hydrocarbons are usually significantly associated with such deposits.

The basic concept of this invention is that of subjecting the gas sample electron bombardment with electrons of controlled energy content, sufficient to cause ionization of the hydrocarbons to be detected, but insufficient to ionize the other constituents which may be present, and observing whether or not ionization does take place.

To more properly understand this invention, reference is hereby made to the drawings which are made a part of this specification.

Figure 1:
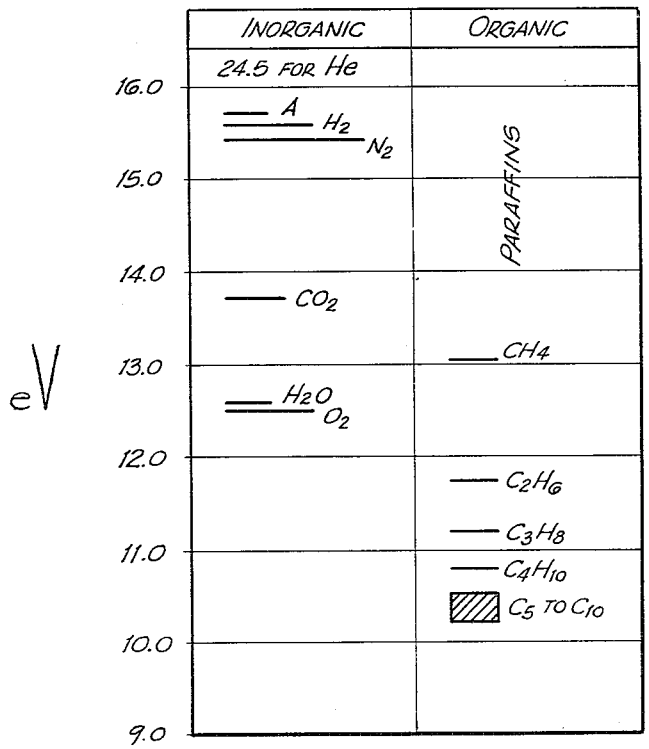
Figure 1 shows ionization potential characteristic of ingredients present in, or possibly present in such gas samples.

Referring now to Figure 1, we find a comparison of the ionization characteristics of the probable or possible constituents of a gas sample. First, remember that if we bombard an atmosphere containing a specific material, with a beam of electrons of controlled maximum energy and gradually increase the energy of such bombardment we may find the "appearance potential" of certain ions by observing the lowest voltage at which production of the ions is detectable.

If the ionic species observed in such an experiment is the ion of the parent molecule itself, say of propane, then the electrons energy at which propane ions appear when the electron energy is slowly increased is that characterized by the ionization potential of propane.

In Figure 1 there are set forth the electron energies appropriate for ionization of the probable or possible components of a soil gas sample. Taking the horizontal line of 12 eV it will be noted that ethane and heavier hydrocarbons may be ionized by energies below that level, and methane and other possible constituents will not be so ionized.

The method will be broadly to bombard the sample with electrons of controlled maximum energy not in excess of 12 eV and determine if ionization occurs.

To do this requires the production of an electron beam of controlled low energy. All sources of electron beams presently known produce particles with initial energies ranging from zero to several electron volts, the distribution function often being Maxwellian. For example, of the electrons emitted by a tungsten filament run at 2500° K., 10% have initial energies in excess of 0.5 volt. Thus, in experimental work using low-energy electrons, such as the study of chemical reactions initiated by "controlled" electrons, the determination of critical potentials, the application of critical potentials to experimental and analytical processes, and the like, the thermal energies are of a magnitude too large to be neglected.

To reduce the distribution of thermal energies, energy filters have been used in the past that are based upon electric or magnetic fields, or on a combination of the two. In particular, the following schemes have proven useful:

1. Transverse magnetic filter—180°
2. Radial Electrostatic filter—127°
3. High frequency, plane electrodynamic filter
4. Crossed transverse electrostatic and magnetic filter Of these four schemes, the first is the simplest and possibly the one most used. It is widely used in such instruments as the mass spectrometer. However, all of these are subject to one consideration. In all, the earth's magnetic field is present and acting and must be considered and controlled, eliminated, or overcome. The transverse magnetic filter type of operation requires an extended, homogeneous magnetic field of constant magnitude. To attempt to realize this by artificial means, at proper intensities for the production of electron beams of tightly controlled low energy and at the same time eliminate, control, or erase the effects of the earth's magnetic field is difficult.

Any of the above methods for control of the energy of the bombarding electrons may be used, but it is preferred to use an electron beam source such as that set forth in the copending application of Richard E. Honig, Serial No. 261,337 which is set forth in Figure 2.

Figure 2:
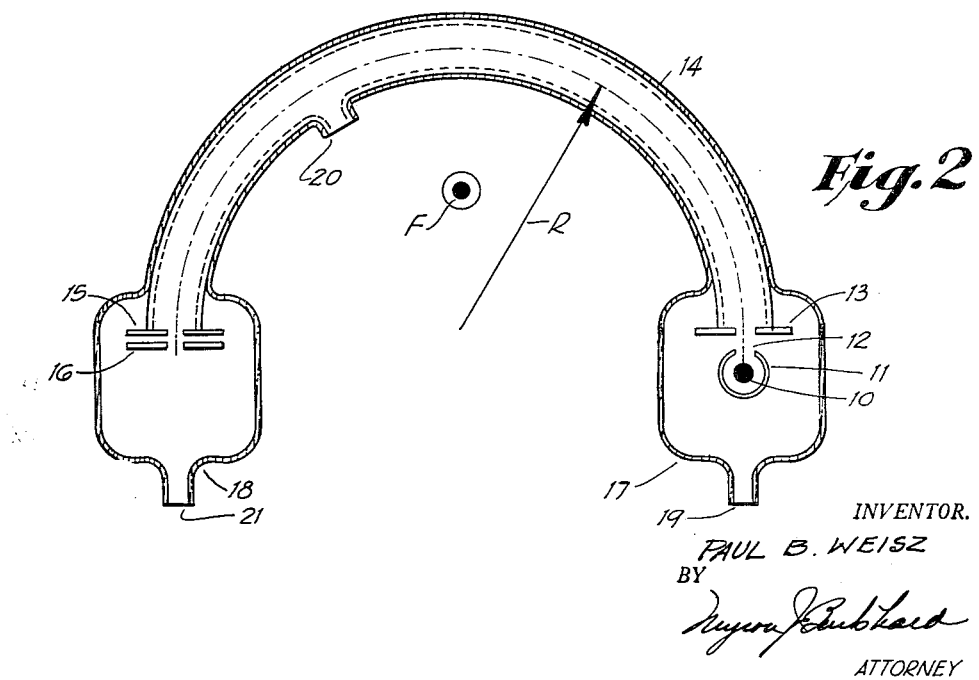
Figure 2 shows a suitable form of equipment for providing electrons of controlled maximum energy.

In Figure 2, 10 is a filamentary source of electrons and 11 is a shell electrode having a directional slit 12 through which electrons are emitted in the desired direction. Slit plate 13 serves to admit these electrons to the curved path portion of the apparatus, housed in tube 14, in which the electrons describe a path of radius R, the magnitude of which is dependent upon the desired energy of electrons to be selected and upon the magnitude of the magnetic field F, which is the terrestrial magnetic field existing at the point and time of operation of the apparatus, the apparatus being so mounted as to be capable of positioning to bring the plane of the electron path normal to the direction of the geomagnetic field. At 15 we find a second slit plate and at 16 an adjustable focusing slit. The path R is housed in a metal tube, electrically integral with slits 13 and 15, providing an electrostatic shield, necessary to prevent the charge-up of glass walls with stray electrons. Vessel 17 serves to house the electron source and vessel 18 to house the process, instrument, or whatever item may be desired for a target of the selected electrons. Connections are provided at 19, 20, 21 for pumping out the various portions of the apparatus to the desired vacuum level, and it will be understood that whatever electrical leads, devices for reaction, targets, and the like are desired may be placed in vessel 18.

The device described is mounted so that it may be placed in desired relation to the geomagnetic field. In its most simple form it could be a support for the device itself, mounted upon double swivels. In an elaborate form, it could be a servo-motor driven device of the character of an equatorial telescope mounting, electronically controlled to be held accurately in the geomagnetic field, although the magnitude of time-direction variations of the geomagnetic field is ordinarily quite small.

Figure 3:
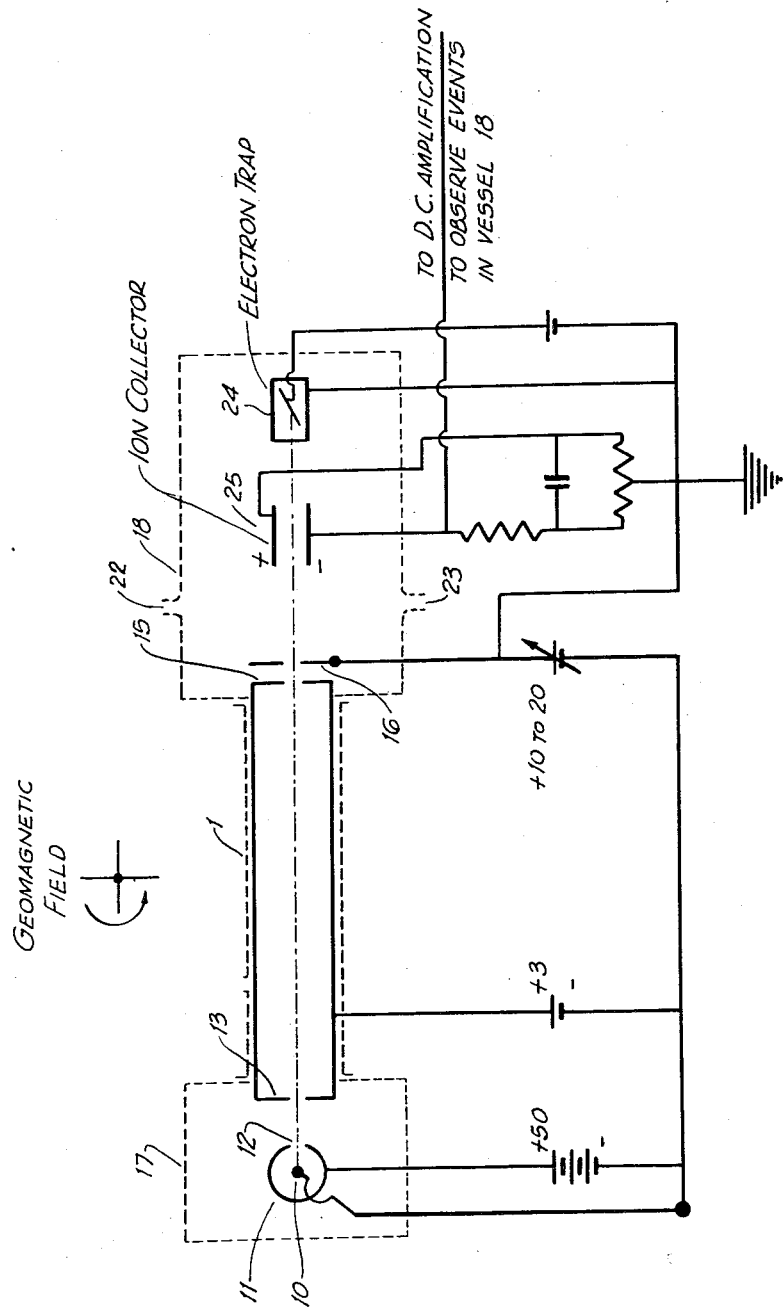
Figure 3 shows in highly diagrammatic form the application of such an electron source to the problem at hand.

In Figure 3 there is shown a schematic electrical setup for the instrument and in connection therewith there is shown, in target vessel 18 an arrangement whereby the present invention may be practised. It being understood that the electron beam source is arranged and adjusted to provide an electron beam of a maximum energy of 12 eV, then the gas under examination will be placed within or flowed through target vessel 18, using connections 22 and 23 for the purpose.

The directed beam of electrons passing through the gas in chamber 18 will arrive at and be disposed of by electron trap 24. In passage through the gas in 18, if there be present ethane or higher hydrocarbons, capable of being ionized by electrons of a maximum energy of 12 eV, then ionization will occur. The ions so formed will be collected by ion collector 25 and will produce an electrical effect which can be led out by conductor and observed, or amplified and observed, in known manner.

The target tube gas may be maintained at a pressure of from 0.1 micron to 50 microns, a pressure of 1.0 to 10.0 microns being preferable and suitable to the electrical characteristics of the circuits shown in Figure 4.

Under such conditions, the instrument will be sensitive to the presence of hydrocarbons of 2 carbon atoms and higher when present in concentrations of the order of 1 part in $10^7$. Of course, if desired, any of the usual methods of effecting concentration sought for constituents may be used, such a fractionation, selective adsorption and the like.

It will be also understood that variations in the pressure within the gas sample and modification of the electrical characteristics of the system may be used to effect changes in the sensitivity of the detection.

Also, other methods of producing electron beams of controlled low maximum energy level may be used.

It will also be understood that the application of an electron beam of controlled low maximum energy, but with the energy being gradually increased, while observation is being made of whether or not ionization occurs at selected levels characteristic of hydrocarbons of 2 or more carbon atoms appears is within the scope of my invention.

I claim:

1. A method of analyzing a mixture of gases for a selected component which has a definite ionization potential that comprises confining the mixture in a chamber, producing electrons of distributed energies, selecting from said electrons those having a specific energy, bombarding the confined gas mixture with the selected electrons to produce selective ionization of only those molecules having ionization potentials equal to and less than the component selected, and detecting and measuring positive ions so produced as an indication of the presence of the particular selected component in the mixture.

2. A method of detecting polyatomic gas components of at least two carbon atoms in a mixture that comprises confining the mixture in a chamber, producing electrons of distributed energies, selecting electrons having only enough energy to ionize molecules of at least two carbon atoms, directing said selected electrons into the confined gas mixture to produce selective ionization of the molecules having at least two carbon atoms, and detecting and measuring positive polyatomic ions thus produced as an indication of the presence of molecules of at least two carbon atoms in the mixture.

3. A method of geophysical prospecting that comprises collecting a sample of soil gas, confining the sample in a chamber, producing electrons of distributed energies, selecting from said electrons those having a specific energy, accelerating the selected electrons to an energy level of twelve electron volts, bombarding the confined gas sample with the accelerated electrons to produce ionization of hydrocarbon molecules containing at least two carbon atoms, and detecting and measuring positive ions so produced as an indication of the presence of the hydrocarbon components of at least two carbon atoms in the sample.

References Cited in the file of this patent

UNITED STATES PATENTS

| Number | Name | Date |
|---|---|---|
| 1,421,720 | Roberts | July 4, 1922 |
| 2,112,845 | Howell | Apr. 5, 1938 |
| 2,485,469 | Allen et al. | Oct. 18, 1949 |
| 2,543,859 | Long | Mar. 6, 1951 |
| 2,582,216 | Koppius | Jan. 15, 1952 |

OTHER REFERENCES

Introduction to Modern Physics, by Richtmyer and Kennard, published by McGraw-Hill Book Co., 4th edition, September 1947, pages 220–224.